United States Patent Office 3,365,269
Patented Jan. 23, 1968

3,365,269
FERROMAGNETIC METAL OXYFLUORIDES
Bertrand L. Chamberland, Wilmington, Del., assignor to E. I. du Pont de Nemours and Company, Wilmington, Del., a corporation of Delaware
No Drawing. Filed Sept. 14, 1964, Ser. No. 396,355
7 Claims. (Cl. 23—50)

ABSTRACT OF THE DISCLOSURE

Congruent melting, fluorine containing ferromagnetic spinels having stoichiometric proportions are prepared by heating a mixture containing the necessary metals, metal oxides and metal fluorides in stoichiometric proportion in a sealed vessel under vacuum or in an inert atmosphere.

Description of the invention

This invention relates to new magnetic materials, and more particularly to ferromagnetic oxyfluorides.

Ferromagnetic materials are employed in a variety of applications, e.g., in magnetic sound recording tapes, drums and records, in memory devices and microwave circuitry, as magnetic cores, such as coil cores in electronic equipment, and as permanent magnets. In some of these applications, ferromagnetic oxides are normally more useful than ferromagentic metals because of their low loss characteristics at high frequencies. Substitution of fluorine for part of the oxygen in such oxides has been proposed, and certain magnetic metal oxyfluorides have been prepared [Schieber, J. Appl. Phys. 35, 1072 (1964)]. In these oxyfluorides, the reduction in total anion valence due to substitution of fluorine for oxygen is largely compensated by vacancies at the cation sites, and the compositions are non-stoichiometric. It is an object of this invention to provide magnetic oxyfluorides having stoichiometric ratios of oxygen and fluorine to total metal. It is another object to provide such oxyfluoride having substantially no vacancies at the cation sites. Still another object is to provide such oxyfluorides that are congruent-melting to provide ease of fabrication of shaped articles. Still another object is to provide single crystal compositions of such oxyfluorides. These and other objects will become apparent hereinafter.

The objects of this invention are obtained by stoichiometric, congruent-melting, transition metal oxyfluorides of spinel structure containing divalent iron. These products correspond to the formula $X_xQ_yFe_z^{+2}O_{4-w}F_w$, wherein X is a trivalent metal selected from V, Cr, Y, Fe, Ti, Ga, and Al; Q is a divalent metal selected from Mn, Fe, Co, and Ni; and $x$, $y$, $z$, and $w$, each have a value of $1.0\pm0.1$, the total of $x$, $y$, and $z$ being $3.0\pm0.1$. Preferred compositions are those in which X is Fe, and Q is Mn, Fe, Co, or Ni. Compositions in which X is V or Cr and Q is Fe, also possess desirable properties.

The above-defined oxyfluoride spinels are referred to as "stoichiometric" in view of the fact that the atomic ratio of total metal to the sum of oxygen and fluorine does not differ essentially from the ratio 3:4 required in the ideal spinel structure. The compositions are shown by their magnetic properties to be substantially free of vacancies and to contain one iron atom per $X_xQ_yFe_zO_{4-w}F_w$ unit in the divalent state. The ratio of divalent iron:fluorine is substantially 1:1. This divalent iron, which in the corresponding oxide is trivalent, compensates the reduced anion charge resulting from the presence of fluorine. The divalent iron atom is believed to occupy an octahedral site in the compositions of this invention. The divalent metal Q may occupy either a tetrahedral or an octahedral site depending upon other metals present. For example, manganese in manganese-iron oxyfluoride spinel is believed to occupy a tetrahedral site while nickel and cobalt in the respective spinels are believed to occupy octahedral sites.

The compositions of this invention are congruent-melting, i.e., the melt and the solid in equilibrium therewith have the same composition. This property is demonstrated by the fact that the melting point is not changed by repeated melting and freezing. The property permits fabrication of useful and intricate shapes, e.g., coil cores and permanent magnets, by melt casting. This method of fabrication is not applicable to compositions which are not congruent-melting.

The fusibility of the compositions of this invention also makes possible their preparation in single crystal form. Such crystals exhibit crystalline anisotropy and are useful as the magnetic component in various devices. Thin films useful in computer applications and in memory storage devices can be prepared by spreading the molten composition on a support or by casting the melt in the form of a self-supporting film. In all these applications where fabrication from the melt is employed, a dense material is produced which is free from voids normally found in sintered materials. Such voids reduce permeability and contribute to dynamic loss, effects which are detrimental in most applications.

The products of this invention are preferably prepared by heating mixtures of metal oxides and fluorides which contain the ingredient elements in proportions indicated by the above formula. Mixtures containing other proportions of the elements can be employed but lead to impure products. Typical reaction mixtures correspond to the combinations shown to the left of the arrow in the following equations:

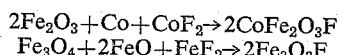
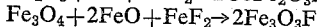
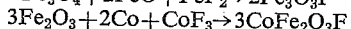
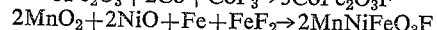
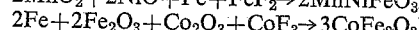
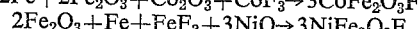
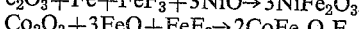
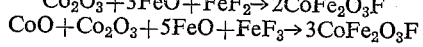

$$2Fe_2O_3+Co+CoF_2 \rightarrow 2CoFe_2O_3F$$
$$Fe_3O_4+2FeO+FeF_2 \rightarrow 2Fe_3O_3F$$
$$3Fe_2O_3+2Co+CoF_3 \rightarrow 3CoFe_2O_3F$$
$$2MnO_2+2NiO+Fe+FeF_2 \rightarrow 2MnNiFeO_3F$$
$$2Fe+2Fe_2O_3+Co_2O_3+CoF_3 \rightarrow 3CoFe_2O_3F$$
$$2Fe_2O_3+Fe+FeF_3+3NiO \rightarrow 3NiFe_2O_3F$$
$$Co_2O_3+3FeO+FeF_2 \rightarrow 2CoFe_2O_3F$$
$$CoO+Co_2O_3+5FeO+FeF_3 \rightarrow 3CoFe_2O_3F$$

The oxides and fluorides usually employed in preparation of compositions of this invention are as follows: $Ti_2O_3$, $MnO_2$, $V_2O_3$, $V_2O_4$, MnO, $Cr_2O_3$, $CrO_2$, $Fe_2O_3$, $Y_2O_3$, FeO, $Ni_2O_3$, NiO, $Co_2O_3$, CoO, $Al_2O_3$, $Ga_2O_3$, $TiO_2$, $YF_3$, $TiF_3$, $TiF_4$, $VF_3$, $VF_4$, $CrF_2$, $CrF_3$, $MnF_2$, $MnF_3$, $FeF_2$, $FeF_3$, $CoF_2$, $CoF_3$, $NiF_2$, $GaF_3$, and $AlF_3$. Materials of commercial purity are entirely satisfactory and no special purification is required.

Heating is carried out under anhydrous conditions in a closed container which is non-reactive with reactants and products. A temperature in the range of 700–1400° C. or higher is usually employed to insure complete reaction. The container may be evacuated before heating is begun or the reactants may be blanketed with an inert gas such as arogn or nitrogen. It is not necessary that the reaction mixture be in the molten state during reaction.

Due to the volatility of the reactants at high temperature, some pressure is built up during heating even though the container is sealed under vacuum before such heating. This autogenous pressure usually amounts to at least 5 atmospheres. The oxyfluoride spinels of this invention can also be prepared at higher pressures, and pressures up to 3000 atmospheres or more are useful. Pressures of 500 atmospheres or below are usually preferred since they are adequate for formation of satisfactory products and do not require use of the expensive equipment needed for reaching higher pressures.

The time of reaction is not critical and may vary from a few minutes, i.e., 10–15 minutes, to 24 hours or longer. Excessively long times are to be avoided since product quality is not improved and equipment is unnecessarily tied up.

Example 1

This example illustrates the preparation of stoichiometric, congruent-melting, manganese-iron oxyfluoride spinel of the formula, $MnFe_2O_3F$. One of the Fe atoms is divalent and the other trivalent. The preparation was carried out in accordance with the following equation:

$$4Fe_2O_3 + 4Fe + 3MnO_2 + 3MnF_2 \rightarrow 6MnFe_2O_3F$$

A mixture of 2.13 g. of $Fe_2O_3$, 0.75 g. of Fe, 0.87 g. of $MnO_2$ and 0.93 g. of $MnF_2$ was placed in a platinum tube which was then evacuated and welded shut. The tube and contents were heated to 1200° C. for 21 hours and then cooled to room temperature. On opening the tube, it was found that a homogeneous crystalline magnetic product had been produced. This product had an X-ray pattern as shown in Table I, which corresponded to that of the spinel crystal structure with a cell constant of 8.45 A. The product had a room temperature saturation magnetization of 71 emu./g. (10,000 oe. field) and a Curie temperature of 419° C. (Fields of 300–1000 oe. were used in all cases for measurement of Curie temperature.) The activation energy of resistance was 0.05 electron volt.

The stoichiometric, congruent-melting, oxyfluoride spinel $MnFe_2O_3F$, was also obtained by heating a mixture of iron, manganese dioxide and manganese difluoride at 1000° C. for 20 hours.

TABLE I.—X-RAY DIFFRACTION PATTERN OF $MnFe_2O_3F$

| Intensity [1] | Interplanar spacing [2] |
|---|---|
| $M_3$ | 4.870 |
| $M_2$ | 3.411 |
| $M_1$ | 2.995 |
| S | 2.547 |
| F | 2.440 |
| F | 2.360 |
| $M_2$ | 2.116 |
| $M_4$ | 1.802 |
| $M_4$ | 1.723 |
| $M_1$ | 1.627 |
| $M_1$ | 1.495 |
| F | 1.336 |
| $M_4$ | 1.287 |
| F | 1.274 |
| F | 1.128 |
| $M_3$ | 1.098 |
| $M_4$ | 1.057 |
| F | 1.014 |
| $M_4$ | 0.976 |

[1] S indicates strong lines; $M_1$, $M_2$, $M_3$, and $M_4$, lines of intermediate intensity in decreasing order; and F, faint lines.
[2] In Angstrom units.

Example 2

This example illustrates the preparation of $MnFe_2O_3F$ according to the equation:

$$2Fe_2O_3 + Mn + MnF_2 \rightarrow 2MnFe_2O_3F$$

A mixture 3.19 g. of $Fe_2O_3$, 0.55 g. of Mn and 0.93 g. of $MnF_2$ was placed in a platinum tube which was sealed under vacuum as described in Example 1. The tube was heated at 1200° C. for 22 hours, slowly cooled to 500° C., and rapidly cooled to room temperature. The product so obtained was a homogenous, black, crystalline solid having an X-ray pattern identical to that of the product of Example 1. The product contained 8.27% fluorine by analysis.

The melting point of the product was determined to be 1364–6° C. from the time-temperature record obtained from a thermocouple embedded in the product during heating to 1400° C. and slow cooling. The same melting point was obtained on three successive melting and freezing cycles, and the X-ray pattern of the product after this treatment was unchanged.

A small single crystal having a 111 plane as the principal face was taken from the product after the above melting and freezing treatments. This crystal weighed 1.10 mg. Magnetization measurements were made from 77° K. (−196° C.) to 298° K. (25° C.) in a field of 10,000 oersteds. The magnetization data were plotted as a function of temperature and extrapolated to 0° K. Magnetizations obtained were as follows:

| At ° K.: | Emu./g. |
|---|---|
| 298 | 84.6 |
| 77 | 99.4 |
| 0 | 100 |

The magnetization of 100 emu./g. at 0° K. corresponds to 4.2 Bohr magnetons per formula weight, which is exactly the moment calculated for ideal stoichiometry assuming that $Fe^{+2}$ in the octahedral site has a moment of 4.2 Bohr magnetons as it does in the spinel structure (see Kittel, "Introduction to Solid State Physics," John Wiley & Sons, New York, 1953, page 166, Table 10.1). The magnetic properties of this single crystal thus confirm that the product is a stoichiometric oxyfluoride spinel.

Example 3

A further preparation of stoichiometric, congruent-melting, $MnFe_2O_3F$, was carried out using a reaction mixture like that of Example 1 by heating a sealed platinum tube containing the reactants at 1000° C. under an external pressure of 200 atmospheres for 8 hours. The walls of the platinum tube were flexible so that the external pressure was transmitted to the reactants. After the heating period, the tube was slowly cooled and the pressure then released. The product was a crystalline, black, highly magnetic material of the following analysis: Fe, 46.60; F, 8.31, 8.32. This analysis corresponds to the formula $MnFe_{1.9}O_3F$.

In a similar manner, the stoichiometric, congruent-melting oxyfluoride spinels, $GaMnFeO_3F$, $YMnFeO_3F$, and $TiMnFeO_3F$ can be prepared by heating mixtures of $Fe_2O_3$, Fe, $MnO_2$, and $MnF_2$ with $Ga_2O_3$ and Ga, $Y_2O_3$ and Y, and $Ti_2O_3$ and Ti, respectively.

Example 4

This example illustrates the preparation of the stoichiometric, congruent-melting, oxyfluoride spinel, $Fe_3O_3F$, according to the equation:

$$2Fe_2O_3 + Fe + FeF_2 \rightarrow 2Fe_3O_3F$$

A mixture of 3.19 g. of $Fe_2O_3$, 0.56 g. of Fe, and 0.94 g. of $FeF_2$ was sealed in a platinum tube as described in Example 1. The tube and contents were heated to 1200° C. for 6.67 hours, then slowly cooled to 300° C. and quenched to room temperature. The black, highly magnetic product was homogeneous when inspected with the optical microscope at 160× magnification. It had an X-ray pattern (Table II) corresponding to a spinel crystal structure having a cell constant of 8.40 A. Saturation magnetization at room temperature was 69.8 emu./g. (10,000 oe. field) and the Curie temperature was 499° C.

In a further preparation carried out in accordance with the above equation, a mixture as above was heated in a sealed, flexible-walled tube at 750° C. under an external pressure of 110 atmospheres for 14.8 hours. The homogeneous product had an X-ray pattern like that above, and a saturation magnetization (16,200 oe. field) of 71.1 emu./g. at room temperature. The fluorine content by analysis was 8.98%.

The process illustrated by this example is also useful in the preparation of other oxyfluoride spinels of this invention. When mixtures of $V_2O_3$, $Cr_2O_3$ or $Al_2O_3$ with $Co_2O_3$ or $Ni_2O_3$ are used instead of $Fe_2O_3$, the following spinel-type oxyfluorides are obtained by this procedure: $VCoFeO_3F$, $VNiFeO_3F$, $CRCoFeO_3F$, $AlCoFeO_3F$, and $AlNiFeO_3F$.

TABLE II.—X-RAY DIFFRACTION PATTERN OF $Fe_3O_3F$

| Intensity[1] | Interplanar spacing[2] |
|---|---|
| $M_2$ | 4.840 |
| $M_3$ | 3.310 |
| S | 2.966 |
| $M_3$ | 2.693 |
| S | 2.536 |
| S | 2.519 |
| F | 2.485 |
| $M_3$ | 2.430 |
| $M_3$ | 2.347 |
| $M_3$ | 2.149 |
| S | 2.101 |
| F | 1.931 |
| $M_3$ | 1.770 |
| $M_2$ | 1.714 |
| F | 1.653 |
| S | 1.616 |
| F | 1.516 |
| S | 1.486 |
| F | 1.424 |
| F | 1.414 |
| $M_3$ | 1.329 |
| $M_3$ | 1.283 |
| $M_4$ | 1.267 |
| V | 1.240 |
| $M_3$ | 1.213 |
| V | 1.180 |
| V | 1.172 |
| $M_3$ | 1.124 |
| $M_2$ | 1.097 |
| V | 1.073 |
| $M_3$ | 1.052 |
| $M_4$ | 0.992 |
| $M_2$ | 0.973 |
| $M_2$ | 0.941 |

[1] S indicates strong lines; $M_1$, $M_2$, $M_3$, and $M_4$, lines of intermediate intensity in decreasing order; F, faint lines; and V, very faint lines.
[2] In Angstrom units.

Example 5

Further preparations of the stoichiometric, congruent-melting iron oxyfluoride, $Fe_3O_3F$, were carried out according to the following equation:

$$3Fe_2O_3 + 2Fe + FeF_3 \rightarrow 3Fe_3O_3F$$

A mixture of the above reactants in the proportions indicated by the equation was sealed in a flexible walled platinum tube under vacuum and heated at 750° C. under 110 atmospheres pressure for 14.8 hours. The product was highly magnetic, had a Curie temperature of 551° C., and had an X-ray pattern identical to those for the products of Example 4.

A magnetic iron oxyfluoride spinel of this invention was also obtained by heating the mixture described above at 1000° C. under 140 atmospheres pressure for 6.5 hours. The homogeneous, highly magnetic product had a saturation magnetization (16,200 oe. field) of 70.6 emu./g. at room temperature, a Curie temperature of 524° C., and an X-ray pattern like that described above. The melting point of this iron oxyfluoride spinel was determined to be between 1325° C. and 1400° C.

Example 6

This example illustrates the preparation of stoichiometric, congruent-melting cobalt-iron oxy-fluoride of spinel structure. The preparation was carried out in accordance with the following equation:

$$2Fe_2O_3 + Co + CoF_2 \rightarrow 2CoFe_2O_3F$$

The reactants, in the proportions defined by the equation, were sealed in a platinum tube as described above and heated at 1200° C. for 6.67 hours. A homogeneous, sintered product, having a spinel structure with a cell constant of 8.36 A., as indicated by its X-ray pattern (Table III), was obtained. This product had a saturation magnetization of 52.9 emu./g. at 77° K. (10,000 oe. field) and a Curie temperature of 473° C.

Cobalt-iron oxyfluoride spinel was also prepared in accordance with the equation:

$$2Co + CoF_3 + 3Fe_2O_3 \rightarrow 3CoFe_2O_3F$$

by heating the reactants in the proportions indicated by the equation under the conditions described above. This product had a Curie temperature of 464° C.

A further preparation of this product was carried out according to the equation:

$$Co_2O_3 + 2Fe + 2Fe_2O_3 + CoF_3 \rightarrow 3CoFe_2O_3F$$

The reactants in the proportions indicated by the equation were heated in a sealed platinum tube at 1200° C. for 12 hours, then slowly cooled to room temperature. The stoichiometric oxyfluoride cobalt-iron spinel so obtained was in the form of a homogeneous sintered boule with a Curie temperature of 466° C.

TABLE III.—X-RAY DIFFRACTION PATTERN OF $CoFe_2O_3F$

| Intensity[1] | Interplanar spacing[2] |
|---|---|
| $M_2$ | 4.840 |
| $M_3$ | 3.316 |
| S | 2.966 |
| $M_3$ | 2.666 |
| S | 2.542 |
| S | 2.519 |
| $M_3$ | 2.424 |
| $M_4$ | 2.318 |
| V | 2.124 |
| S | 2.097 |
| $M_4$ | 1.926 |
| F | 1.836 |
| $M_3$ | 1.765 |
| $M_2$ | 1.714 |
| F | 1.660 |
| S | 1.614 |
| S | 1.485 |
| $M_3$ | 1.423 |
| S | 1.411 |
| $M_3$ | 1.329 |
| $M_2$ | 1.282 |
| $M_3$ | 1.266 |
| $M_3$ | 1.213 |
| F | 1.175 |
| $M_3$ | 1.123 |
| $M_1$ | 1.094 |
| $M_2$ | 1.051 |
| $M_4$ | 0.991 |
| $M_2$ | 0.971 |
| F | 0.965 |
| $M_2$ | 0.941 |
| V | 0.923 |

[1] S indicates strong lines; $M_1$, $M_2$, $M_3$, and $M_4$, lines of intermediate intensity in decreasing order; F, faint lines; and V, very faint lines.
[2] In Angstrom units.

Example 7

The oxyfluoride spinel $NiFe_2O_3F$ was prepared in accordance with the following equation:

$$2Fe_2O_3 + Ni + NiF_2 \rightarrow 2NiFe_2O_3F$$

The reaction was carried out in a sealed platinum tube as described in Example 1. The tube and contents were heated to 1200° C. for 6.67 hours under autogenous pressure and then slowly cooled to room temperature. The magnetic, black boule so produced was homogeneous as observed under a magnification of 160×. It had a saturation magnetization of 45.5 emu./g. at 77° K., (10,000 oe. field) and a Curie temperature of 520° C. The cell constant determined from the X-ray pattern (Table IV) was 8.36 A.

TABLE IV.—X-RAY DIFFRACTION PATTERN OF $NiFe_2O_3F$

| Intensity [1]: | Interplanar spacing [2] |
|---|---|
| $M_2$ | 4.817 |
| $M_4$ | 3.316 |
| S | 2.958 |
| F | 2.693 |
| S | 2.530 |
| S | 2.507 |
| $M_3$ | 2.414 |
| V | 2.327 |
| S | 2.089 |
| $M_4$ | 1.918 |
| V | 1.768 |
| $M_2$ | 1.707 |
| S | 1.608 |
| S | 1.478 |
| $M_3$ | 1.415 |
| $M_3$ | 1.323 |
| $M_2$ | 1.276 |
| $M_3$ | 1.261 |
| $M_3$ | 1.207 |
| $M_4$ | 1.170 |
| $M_3$ | 1.118 |
| $M_1$ | 1.090 |
| $M_2$ | 1.046 |
| $M_4$ | 0.987 |
| $M_2$ | 0.967 |
| F | 0.960 |
| $M_2$ | 0.936 |
| V | 0.919 |

[1] S indicates strong lines; $M_1$, $M_2$, $M_3$, and $M_4$, lines of intermediate intensity in decreasing order; F, faint lines; and V, very faint lines.
[2] In Angstrom units.

*Example 8*

This example illustrates the preparation of the stoichiometric, congruent-melting oxyfluoride spinel, $VFe_2O_3F$, in accordance with the following equation:

$$V_2O_3 + FeF_2 + Fe_2O_3 + Fe \rightarrow 2VFe_2O_3F$$

A mixture of the reactants in the proportions indicated by the equation was placed in a platinum tube which was evacuated and sealed. The tube and contents were heated at 1200° C. for 12.5 hours under autogenous pressure and then cooled slowly to room temperature. The product was a homogeneous, magnetic, sintered boule having a spinel crystal structure with a cell constant of 8.46 A. The Curie temperature was 49° C.

The process illustrated by this example is also useful for the preparation of $AlFe_2O_3F$, $YFe_2O_3F$, $GaFe_2O_3F$, and $TiFe_2O_3F$.

*Example 9*

The oxyfluoride spinel, $CrFe_2O_3F$, was prepared as indicated in the following equation:

$$Cr_2O_3 + Fe_2O_3 + Fe + FeF_2 \rightarrow 2CrFe_2O_3F$$

A mixture of reactants in the proportions indicated by the equation was sealed under vacuum in a platinum tube, heated to 1200° C. under autogenous pressure for 18.5 hours, and slowly cooled. The product was a stoichiometric, congruent-melting, oxyfluoride spinel, with a Curie temperature of 100° C.

As previously stated, the oxyfluoride spinel compositions of this invention are magnetic and can be used in a variety of applications. The congruent-melting property makes the compositions especially useful for fabrication of coil cores and permanent magnets. The ease of fusibility makes possible the preparation of single crystal compositions.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A stoichiometric, congruent-melting composition of the spinel structure substantially free of vacancies at the cation sites having the formula $$X_xQ_yFe_z^{+2}O_{4-w}F_w$$

wherein X is a trivalent metal selected from the class consisting of V, Cr, Y, Fe, Ti, Ga and Al; Q is a divalent metal selected from the class consisting of Mn, Fe, Co and Ni; and $x$, $y$, $z$ and $w$ each have a numerical value of $1.0 \pm 0.1$, the total of $x$, $y$ and $z$ being $3.0 \pm 0.1$.

2. The composition of claim 1 wherein X is Fe and Q is Mn.

3. The composition of claim 1 wherein X is Fe and Q is Fe.

4. The composition of claim 1 wherein X is Fe and Q is Co.

5. The composition of claim 1 wherein X is Fe and Q is Ni.

6. The composition of claim 1 wherein X is Cr and Q is Fe.

7. The composition of claim 1 wherein X is V and Q is Fe.

References Cited

UNITED STATES PATENTS

| 2,893,830 | 7/1959 | Brixner | 23—50 |
| 3,093,453 | 6/1963 | Frei et al. | 23—50 |
| 3,193,502 | 7/1965 | Schieber | 23—50 X |
| 3,227,653 | 1/1966 | Frei et al. | 252—62.5 X |

MILTON WEISSMAN, *Primary Examiner.*

OSCAR R. VERTIZ, *Examiner.*

H. T. CARTER, *Assistant Examiner.*